United States Patent Office 2,806,767
Patented Sept. 17, 1957

2,806,767
METHOD OF REMOVING OXYGEN FROM MIXTURES OF HYDROGEN AND NITROGEN

Joseph A. Chenicek, Bensenville, Ill., assignor to Universal Oil Products Company, Des Plaines, Ill., a corporation of Delaware No Drawing. Application August 27, 1953,
Serial No. 376,970

3 Claims. (Cl. 23—198)

This invention relates to a method of purifying a gas stream and particularly to a method of removing oxygen from a gas stream containing inert and/or reducing gases.

This invention is particularly adaptable to the process of removing oxygen from an ammonia synthesis gas which is a mixture comprising hydrogen and nitrogen, preferably in a volume proportion of 3 volumes of hydrogen to 1 volume of nitrogen. Although the purification of ammonia synthesis gas is the preferred use of this invention, it is of course understood that the present process will find use in many other purifications, particularly those in which the gas to be purified is an inert gas such as nitrogen, helium, neon, carbon dioxide, etc., or a reducing gas such as hydrogen, methane, ethane, ammonia, etc., or mixtures of inert gases and reducing gases.

It is particularly desirable in the process of synthesizing ammonia from mixtures of nitrogen and hydrogen to have a stream that is substantially free of oxygen since oxygen tends to deactivate the catalyst and form undesirable contaminants in the product stream. The present invention provides a means of removing even slight traces of oxygen from such a stream.

It is an embodiment of the present invention to remove oxygen from an oxygen-containing gas by a method which comprises contacting the oxygen-containing gas with hydrazine.

In a more specific embodiment, the present invention relates to a process for removing oxygen from an oxygen, hydrogen, and nitrogen-containing gas stream which comprises contacting the gas stream with hydrazine.

In a particularly preferred embodiment the present invention relates to a process for removing oxygen from an oxygen, hydrogen, and nitrogen-containing gas stream which comprises contacting the gas stream with aqueous hydrazine.

In the preferred embodiment of the present invention the oxygen-containing gas stream is contacted with aqueous hydrazine which may contain from about 5% to about 99% by weight of hydrazine at any temperature that is suitable to maintain the hydrazine solution in the liquid phase under the existing pressure conditions.

It is preferred that the contacting vessel be provided with a means for effecting intimate contact between a gas and a liquid stream. This may be done by passing the gas in finely subdivided form through a bath of the liquid by introducing the gas into the hydrazine-containing vessel through spray nozzles or jets. In a more preferred embodiment a continuous, countercurrent contact is effected by passing the gas into the lower portion and the hydrazine into the upper portion of a vessel containing bubble decks, perforated trays, mechanical impellers, or packing such as inert clay saddles, rings or the like.

Regardless of the mode of contact used, a small stream of hydrazine solution may be continuously withdrawn and fractionated to remove at least a portion of the water and to enrich the hydrazine solution accordingly. The enriched solution may then be returned to the treating zone. By this means the concentration of the treating solution may be maintained substantially constant. The quantity of solution withdrawn for enrichment will be exceedingly small since the amount of oxygen to be removed from the gas, and consequently the quantity of water formed is small compared to the quantity of gas treated.

The hydrazine solution may be maintained within suitable concentration limits by withdrawing and discarding solution and adding fresh hydrazine to the vessel or by batchwise withdrawal and enrichment of solution.

Oxygen is removed from the gas stream by the reaction symbolized in the following chemical equation:

$$H_2N-NH_2 + O_2 \rightarrow N_2 + 2H_2O$$

This means of removing oxygen from an ammonia synthesis gas is particularly suitable since the products of the reaction are not foreign to the reactants in the process. The amount of oxygen contained as impurity in the gas stream will generally be so low as to consume very little hydrazine thereby not seriously disturbing the volume ratio of nitrogen to hydrogen by the resultant liberation of nitrogen from the hydrazine. The water formed by the reaction tends to dilute the hydrazine purifying solution, however, such dilution can be readily remedied as hereinbefore described by continuously adding fresh hydrazine and continuously withdrawing diluted solution which may be fractionated to form an enriched hydrazine solution which may be again charged to the treating zone. When the gas to be purified contains extremely large quantities of oxygen, the amount of nitrogen in the gas mixture may be reduced accordingly so that the nitrogen produced in the treating reaction will cause the effluent gas from the treating zone to have the proper proportion of nitrogen to hydrogen. In certain cases it may be desirable to dry the gas stream after deoxygenation.

Following are examples which are included to illustrate a preferred mode of operation of this invention but which are not intended to limit unduly the invention to the particular materials or conditions shown.

Example I

A gas mixture containing 3 parts hydrogen, 1 part nitrogen and 0.3 volume percent oxygen is countercurrently contacted in a column packed with clay saddles maintained at 60° C. and atmospheric pressure with a 73 weight percent aqueous solution of hydrazine. The effluent gas is substantially reduced in oxygen content and is a suitable mixture for ammonia synthesis.

Example II

Small quantities of oxygen are removed from commercial cylinder nitrogen by bubbling the nitrogen, in finely subdivided form, through a bath of hydrazine solution having a starting concentration of about 95 weight percent to obtain a substantially oxygen-free stream of nitrogen gas.

I claim as my invention:

1. In the synthesis of ammonia from a mixture of hydrogen and nitrogen containing oxygen as an impurity, the method of purifying said mixture prior to the ammonia synthesis which comprises contacting the same with liquid hydrazine, thereby removing oxygen from and adding nitrogen to the gas mixture, and separating the latter from the liquid.

2. The method of claim 1 further characterized in that the hydrazine is in aqueous solution.

3. The method of claim 1 further characterized in that the hydrazine and the gas mixture are countercurrently contacted.

References Cited in the file of this patent

Audrieth: "The Chemistry of Hydrazine," J. Wiley and Sons, N. Y., 1951, pages 57, 96, 97, 101, 102.

Mellor: "Comprehensive Treatise on Inorganic and Theoretical Chemistry," Longmans, Green and Co., N. Y., 1928, vol. 8, page 313.